United States Patent
Lim et al.

(10) Patent No.: US 7,398,676 B2
(45) Date of Patent: Jul. 15, 2008

(54) LEAK SENSOR AND LEAK SENSING SYSTEM

(75) Inventors: Pyoung-Ho Lim, Gyeonggi-do (KR); Jong-Kook Song, Gyeonggi-do (KR); Sung-Ho Jo, Gyeonggi-do (KR); Ki-Hwan Park, Gyeonggi-do (KR); Tae-Gun Kim, Gyeonggi-do (KR); Woo-Koen Kim, Gyeongg-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 127 days.

(21) Appl. No.: 11/382,747

(22) Filed: May 11, 2006

(65) Prior Publication Data

US 2007/0006638 A1   Jan. 11, 2007

(30) Foreign Application Priority Data

Jul. 5, 2005   (KR) .............. 10-2005-0060428

(51) Int. Cl.
*G01M 3/04* (2006.01)

(52) U.S. Cl. ............... 73/40; 73/40.7; 73/46; 340/604; 340/605

(58) Field of Classification Search ........ 73/40, 73/40.7, 46; 340/604, 605

See application file for complete search history.

(56) References Cited

U.S. PATENT DOCUMENTS

| | | | |
|---|---|---|---|
| 6,175,310 B1 * | 1/2001 | Gott | 340/605 |
| 6,877,359 B2 * | 4/2005 | Huang et al. | 73/40 |
| 2003/0222783 A1 * | 12/2003 | Amacher | 340/604 |

FOREIGN PATENT DOCUMENTS

| | | | |
|---|---|---|---|
| JP | 57-051619 | 3/1982 | |
| JP | 02-051036 | 2/1990 | |
| JP | 3-28754 A * | 2/1991 | 204/194 |
| JP | 08-215534 | 8/1996 | |
| KR | 10-0389067 | 9/2001 | |
| KR | 10-0472417 | 5/2004 | |

OTHER PUBLICATIONS

English language abstract of Korean Publication No. 10-0389067.
English language abstract of Korean Publication No. 10-0472417.
English language abstract of Japanese Publication No. 08-215534.

* cited by examiner

*Primary Examiner*—Daniel S Larkin
(74) *Attorney, Agent, or Firm*—Marger Johnson & McCollom, P.C.

(57) ABSTRACT

A leak sensor and a leak sensing system are provided. The leak sensor preferably includes a fluid sensing member that is capable of sensing and indicating the presence of a fluid leaked from a fluid storage or transport member. The leak sensor further preferably includes at least two wires communicating with the fluid sensing member. The wires are preferably configured to be short-circuited when they contact the fluid leaked from the fluid storage or transport member. An electrical signal corresponding to a leak sensor location can thereby be sent to a control terminal of the leak sensing system. A portion of the wires may be arranged in a cable coated with a protective material such as Teflon®. The control box (or terminal) preferably receives electrical signals from a plurality of leak sensors. The electrical signals can provide information on whether the fluid has leaked and on which leak sensor or sensors have detected the fluid leak.

22 Claims, 2 Drawing Sheets

LEAK SENSOR AND LEAK SENSING SYSTEM

CROSS-REFERENCE TO RELATED APPLICATIONS

This U.S. non-provisional patent application claims priority under 35 U.S.C. §119 from Korean Patent Application 2005-60428 filed on Jul. 5, 2005, the contents of which are hereby incorporated herein by reference in their entirety.

BACKGROUND OF THE INVENTION

The present invention relates to leak detection systems for semiconductor processing equipment. More specifically, the present invention is directed to a leak sensor capable of indicating constituents of chemical leaks as well as a leak sensing system using leak sensors.

With the recent trend toward higher density semiconductor devices and an increasing number of processes, it is desirable to have more efficient and higher quality semiconductor manufacturing processes. Enhancement of the process quality, however, is highly dependent on improvement in the functionality and performance of the semiconductor manufacturing apparatuses and equipment used in these processes. Such apparatuses and equipment include, for instance, wastewater treatment equipment and chemical supply equipment. Chemical supply equipment can include pipes configured to supply various chemicals (e.g., photoresist and cleaning solution) to a semiconductor manufacturing apparatus.

In order to perform the semiconductor manufacturing processes, various equipment is connected to the semiconductor apparatus. Unfortunately, accidents frequently result from leakages occurring at equipment connection points. Although environmental safety patrols may occasionally be conducted to detect and prevent accidents caused by such leakages, it is generally difficult for people to detect minute leakages. Operators (and particularly those operators with a limited understanding of the chemicals being used) may therefore be inadvertently exposed to the chemicals. Furthermore, if the leakage is not detected and suppressed at an early stage, multiple accidents may be caused from the leakages. These accidents may include secondary or tertiary accidents from electric cables or other equipment and facilities that are damaged by the chemical leakage. As a result, semiconductor manufacturing lines may be required to be stopped for prolonged periods of time while the failure points are determined and the necessary repairs are conducted.

Some conventional leak sensing systems use a point-type leak sensor that emits a light and calculates the intensity of light reflected back to the sensor to determine when a leakage occurs. Other conventional leak sensing systems may use a wire-type leak sensor. There are two kinds of wire-type leak sensors. One wire-type leak sensor incorporates a two-wired cable that is short-circuited when a leakage occurs to sense the leakage. The other wire-type leak sensor includes a cable, wherein a resistance of the cable is determined to sense the occurrence of a leakage.

Unfortunately, conventional leak sensors are generally installed in a semiconductor apparatus or a valve box, and they are therefore unable to sense a leakage of a utility pipe. They are also generally unable to detect the kind of chemical leaked. Moreover, the light emitted by a point-type leak sensor may be absorbed by the leakage, thereby reducing the intensity of the light reflected back to the sensor. The point-type leak sensor may therefore not be able to adequately sense the occurrence of the leakage.

SUMMARY OF THE INVENTION

Exemplary embodiments incorporating principles of the present invention provide a leak sensor and a leak sensing system. In an exemplary embodiment, for instance, the leak sensor may include a fluid sensing member capable of sensing and indicating the presence of a fluid leakage. Two or more wires may further be combined within the fluid sensing member.

In another exemplary embodiment, the leak sensor may include a film that is capable of visually indicating the presence of a fluid that is leaked from a pipe through which the fluid flows. The film preferably encircles a circumference of the pipe and at least two wires may be incorporated in the film. The wires are preferably configured to be short-circuited by contact with the fluid leaked from the pipe.

In a further exemplary embodiment, the leak sensing system may include a plurality of fluid sensors. The fluid sensors are preferably arranged to encircle a pipe through which a fluid flows at multiple locations along the pipe where leaks are likely to occur. The fluid sensors are preferably configured to visually indicate when the fluid is leaked from the pipe. A plurality of cables are also preferably provided in conjunction with the plurality of fluid sensors to electrically indicate the presence of a fluid leakage from the pipe. A control box is further preferably electrically connected to the plurality of cables to receive information from the cables that indicates when and where a fluid leakage occurs.

BRIEF DESCRIPTION OF THE DRAWINGS

The principles and features of the present invention will now be described more fully hereinafter with reference to the accompanying drawings showing various exemplary embodiments thereof, in which like numbers represent like elements, and in which.

DETAILED DESCRIPTION OF PREFERRED EMBODIMENTS

The principles of the present invention will now be described more fully hereinafter with reference to various exemplary embodiments thereof. It should be recognized, however, that the invention may be embodied in many different forms and should therefore not be construed as being limited to any one or more of the embodiments set forth herein. Rather, the various embodiments are described herein so that this disclosure will be thorough and complete, and will fully convey the scope of the invention to those of ordinary skill in the art.

Figure 1:
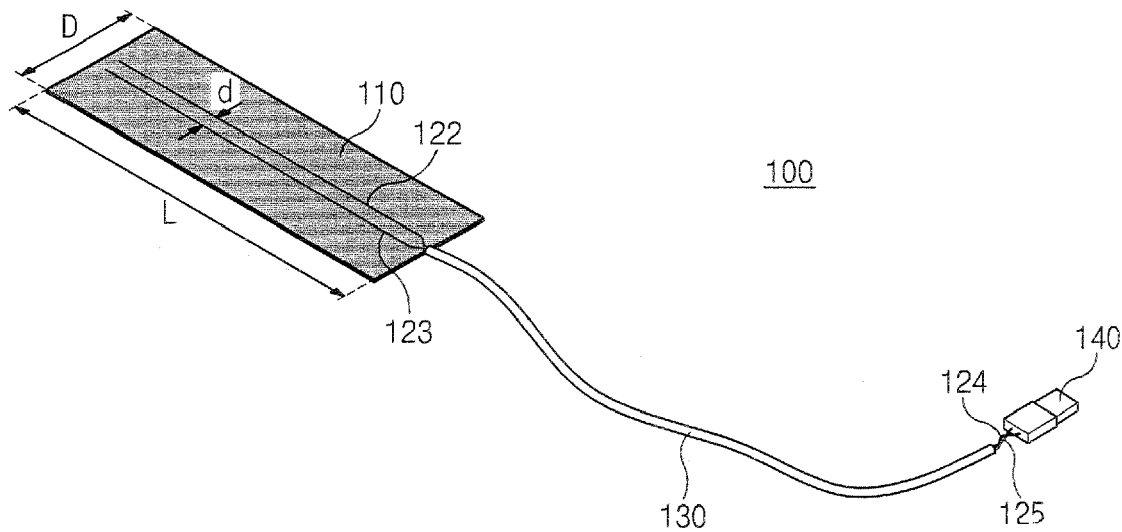
FIG. 1 is a somewhat schematic perspective view of a leak sensor according to an exemplary embodiment of the present invention.

FIG. 1 is a somewhat schematic perspective view of a leak sensor 100 according to an exemplary embodiment of the present invention. Referring to FIG. 1, the leak sensor 100 preferably includes a film 110 that indicates whether a leakage has occurred. The film 110 is preferably a litmus paper that is further capable of indicating a constituent of a fluid such as, for example, a chemical used in a semiconductor apparatus.

Litmus is a reagent that is red in acid and blue in alkali. Litmus paper 110 is obtained by soaking a paper, such as a filter paper in litmus and then drying the paper. Since, by changing color, the litmus paper 110 enables users to visually determine whether a solution is acidic or alkali, it is a suitable film for indicating whether a chemical is leaked. If litmus paper 110 is adopted to indicate whether a chemical is leaked, the acidity may be visually checked and users may therefore be adequately prepared to cope with the acidity of the leaked chemical. As is known, the litmus paper 110 turns red in pH 5 or lower, blue in pH 8 or higher, and violet in pH 5-8. By observing a color change of the litmus paper 110, the level of acidity of a leaked chemical can be visually checked and can thereby reduce the amount of time required for determining the kind of chemical leaked.

Figure 2:
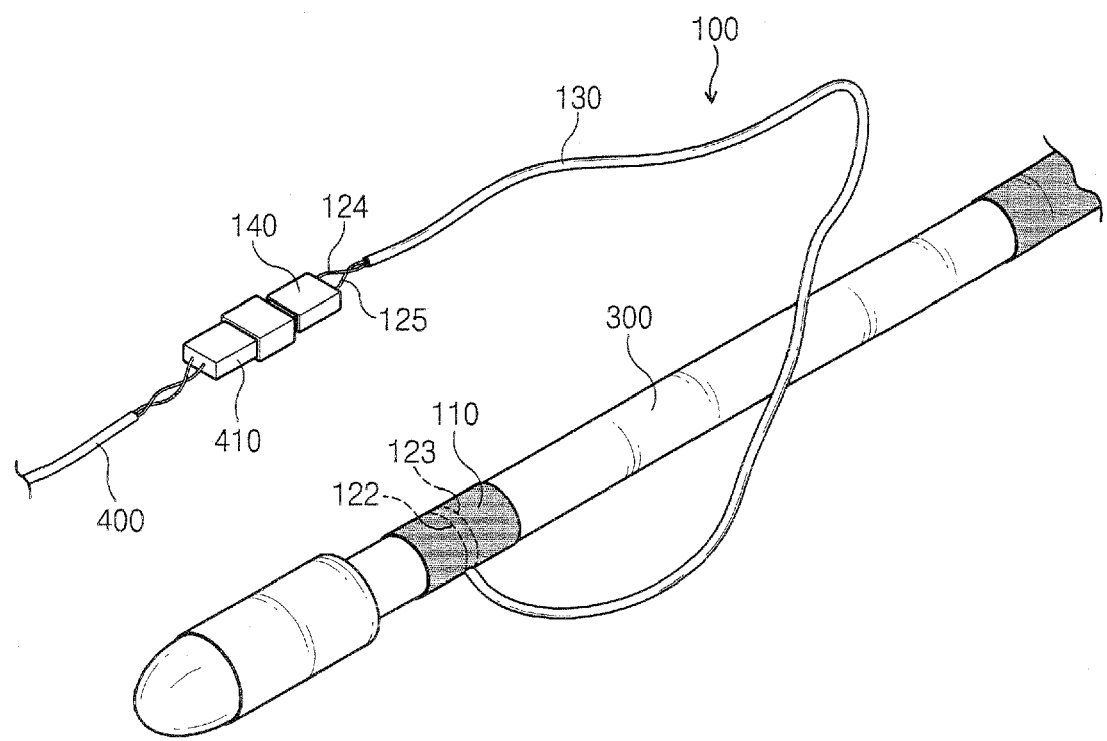
FIG. 2 is a somewhat schematic perspective view illustrating a leak sensor arranged on a pipe in accordance with another aspect of the present invention.

FIG. 2 is a somewhat schematic illustration of a leak sensor 100 arranged on a pipe 300, in accordance with another aspect of the present invention. Referring to FIGS. 1 and 2, the litmus paper 110 is preferably wrapped around a circumference of a pipe 300 proximal to a connection. A length "L" of the litmus paper 110 is preferably sufficient to encircle the pipe 300 and is therefore dependent on the thickness of the pipe 300. Furthermore, a width D of the litmus paper 110 should be sufficient to sense the occurrence of the leakage. In this embodiment, for example, the litmus paper 110 may have a width "D" of about 50 millimeters.

The width "D" of the litmus paper 110 is not limited thereto, however, and may be modified as desired according to any particular need or design. The litmus paper 110 preferably includes an adhesive for attaching the litmus paper 110 to the pipe 300, such as a sticky layer arranged on a surface of the litmus paper 110.

At least two wires 122, 123 are preferably encapsulated or otherwise incorporated into the litmus paper 110 in such a way as to be short-circuited by a leaked chemical when the leakage occurs. The wires 122, 123 should be spaced apart from each other at an appropriate distance "d" so as to be short-circuited when leakage occurs. If the space "d" between the wires 122, 123 is too large, the sensitivity of the leak sensor to a leakage occurrence may be lowered. On the other hand, if the space "d" is too small, the wires 122, 123 may be short-circuited due to reasons other than the occurrence of a leakage. The space "d" between the wires 122, 123 is preferably less than about 2 millimeters to increase the wires' sensitivity to the occurrence of a leak.

The wires 122, 123 going from the sensor 100 to a connector 140 are preferably coated with a coating material 124, 125 to protect them from damage or accidental short-circuiting. In addition, the cables 124, 125 may be further enclosed in a cable coating 130 that is made of or coated with Teflon®. Teflon® is durable against chemicals, and can therefore protect the cables 124, 125 from damage due to the leaked chemicals. The leak sensor 100 of this embodiment is preferably short-circuited by a chemical leakage and should be replaced after a leakage occurs. The connector 140 is therefore preferably provided to enable ready replacement of the sensor 100 with a new one. The connector 140 is preferably electrically connected with a control box (or terminal) (see 500 of FIG. 3) through a connector 410.

Referring specifically to FIG. 2, the litmus paper 110 of the leak sensor 100 is preferably arranged near a connecting section of the pipe 300. The pipe 300 may be any one of a number of different pipes providing a flow path for a fluid, such as chemicals, used in the manufacturing process. The pipe 300 may, for instance, be configured to supply or exhaust chemicals, or it may be a pipe configured for treating wastewater, such as acidic or alkaline wastewater. The connector 140 is preferably electrically connected to the control box 500 through an electrical connector 410 of a cable 400.

When a leakage occurs in the pipe 300, the litmus paper 110 preferably turns a specific color that depends on the content of the leaked chemical, thereby indicating a constituent of the chemical. In addition, the wires 122, 123 in the litmus paper 110 are short-circuited by the leaked chemical and transmit a signal to the control box 500 through the cables 130, 400. Since, in this embodiment, a leak sensor 100 whose wires 122, 123 are short-circuited by a leaked chemical cannot be reused, the electrical connector 140 is disconnected from the control box electrical connector 410 and an electrical connector 140 from a new sensor 100 is attached.

In this embodiment, the leak sensor 100 may be able to sense even a small leakage because the litmus paper 110 is attached to a connection part of the pipe 300. The leak sensor 100 thereby enables an operator to take remedial action in response to the leakage at an early stage to prevent damage resulting from the leakage.

Figure 3:
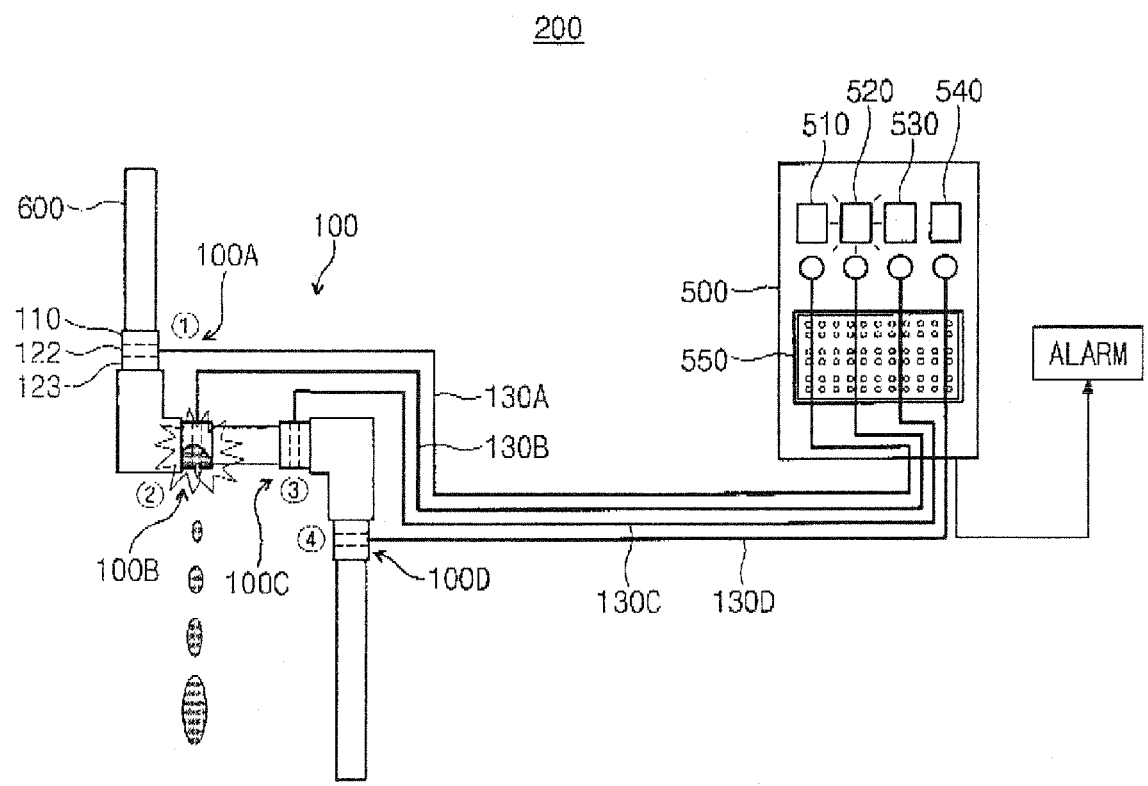
FIG. 3 is a somewhat schematic block diagram illustrating a leak sensing system according to a still further aspect of the present invention.

FIG. 3 is a somewhat schematic block diagram illustrating a leak sensing system 200 according to a further aspect of the present invention. Referring to FIG. 3, a plurality of leak sensors 100A, 100B, 100C, 100D are attached to connection portions of a drain 600. The drain could, for example, be a drain pipe 600 of a semiconductor apparatus. Each leak sensor 100A, 100B, 100C, 100D comprises litmus paper 110 and a plurality of wires 122, 123. A cable 130A, 130B, 130C, 130D from each respective one of the leak sensors 100A, 100B, 100C, 100D is electrically connected to a control box or terminal 500. The control box 500 preferably receives power of a predetermined voltage and includes a relay installed therein. The relay functions as a switch when leakage occurs. The wires 122, 123 receive an electric signal from the control box 500. When the wires 122, 123 are short-circuited, a short-circuited electric signal (or leakage sensing signal) is transmitted back to the control box 500. The control box 500 then preferably sends an alarm signal to the semiconductor apparatus in response to the short-circuited electric signal from the leak sensor 100, thereby enabling an operator to repair the leak without delay.

The control box is also preferably provided with a plurality of lamps 510, 520, 530, 540 that illuminate in response to a short-circuited electric signal from a respective one of the leak sensors 100A, 100B, 100C, 100D. The lamps 510, 520, 530, 540 thereby visually indicate both when a leakage occurs and also the location of the leakage. For example, if a leakage sensing signal is transmitted to the signal box 500 from a leak sensor 100B attached to a second connection portion of the drain pipe 600, a second lamp 520 is preferably flickered to indicate that a leakage has occurred at the second connection portion. The other lamps 510, 530, 540 preferably operate in a similar manner with respect to the leak sensors 100A, 100C, 100D arranged at the first, third, and fourth connection portions. The lamps 510, 520, 530, 540 may comprise light-emitting diodes (LEDs). The control box 500 is also preferably provided with a speaker 550 for emitting an audible alarm to inform an operator of a leakage sensed by one or more of the leak sensors 100A, 100B, 100C, 100D.

More specifically, when a leakage occurs at the second connector of the drain pipe 600, the litmus paper 110 of the leak sensor 100B changes color in response to the leaked chemical. The color preferably indicates a constituent of the leaked chemical. At the same time, the wires 122, 123 arranged in the litmus paper 110 of the leak sensor 100B are short-circuited by the leaked chemical and transmit an electric signal indicating the leakage to the control box 500. In response to the electrical signal, the second lamp 520, corresponding to the leak sensor 100B arranged at the second connector location, is flickered and an audible alarm is output from the speaker 550. Using this system, the leak sensing system provides the user with the ability to identify and repair the leakage soon after it occurs. The visual and audible alarms generated by the control box 500 to indicate the leakage occurrence and location further permit an operator to quickly escape from an area in proximity to the place where the leakage occurs, thereby preventing inadvertent exposure to the leaked chemicals.

Although for convenience and simplicity FIG. 3 illustrates only one drain pipe 600 having four connection portions connected with respective leak sensors 100A, 100B, 100C, 100D, any number of sensors may be supported. For instance, assuming a semiconductor cleaning apparatus is provided with ten drain pipes each having ten connectors, one hundred leak sensors can be attached to respective ones of the one hundred connectors to sense when and where a leakage occurs.

In summary, according to various principles and aspects of the present invention, numerous advantages can be achieved over the prior art. Among other things, the principles of the present invention help protect operators from accidents caused by chemical leaks. In addition, using the principles of the present invention, it is possible to prevent secondary and tertiary accidents resulting from damage to chemical pipes, electric cables, and other facilities caused by the leakage. Losses resulting from semiconductor manufacturing line down time can therefore be eliminated or reduced. A leak sensing system that utilizes litmus paper also makes it possible to reduce the time required for conducting environment safety patrols. More particularly, a leak sensing system constructed according to the principles of the present invention is advantageous in reducing the time for inspecting the semiconductor manufacturing lines following an earthquake. Furthermore, the principles of the present invention make it possible to achieve a more defect-free system that is capable of readily identifying leaks and preventing accidents.

Although the present invention has been described above in connection with various particular embodiments of the present invention as illustrated in the accompanying drawings, it should be noted that the invention is not limited to those embodiments. Rather, it will be apparent to those of ordinary skill in the art that various substitutions, modifications, and additions may be made thereto without departing from the spirit and scope of the invention as encompassed by the appended claims.

What is claimed is:

1. A leak sensor adapted to sense and indicate the presence of a fluid leak from a fluid containing member, said leak sensor comprising:
   a fluid sensing member comprising a material adapted to sense and indicate a fluid leak from a fluid containing member; and
   two or more wires arranged in communication with the fluid sensing member at a terminal end of the two or more wires, a remaining portion of the two or more wires being coated with a material configured to prevent the remaining portion from contacting fluids, wherein the two or more wires are configured to be short-circuited by the fluid leak and to convey an electrical signal indicating the fluid leak.

2. The leak sensor of claim 1, wherein the fluid sensing member comprises a film-type sensing member configured to be attached to the fluid containing member proximal to a joint of the fluid containing member where leaks are likely to occur.

3. The leak sensor of claim 2, wherein the film-type sensing member comprises a litmus paper adapted to visually indicate a constituent of the fluid leak from the fluid containing member.

4. The leak sensor of claim 3, wherein the two or more wires are arranged within the litmus paper.

5. The leak sensor of claim 1, wherein the two or more wires configured to be short-circuited when they contact the fluid leak are connected to a control terminal through one or more electrical connectors so that the leak sensor can be readily attached to or removed from a leak sensing system.

6. The leak sensor of claim 1, wherein a portion of the two or more wires is coated with a material comprising one of (a) fluorinated ethylene propylene, (b) perfluoroalkoxy copolymer, and (c) polytetrafluoro ethylene.

7. The leak sensor of claim 1, wherein the fluid containing member is substantially cylindrical and used for transferring fluids, and wherein the fluid sensing member wraps around a circumferential section of the fluid containing member.

8. The leak sensor of claim 1, wherein an end of each of the two or more wires opposite the portion within the fluid sensing member is coupled to a first connector that enables the leak sensor to be readily connected to and disconnected from a second connector, wherein the second connector is coupled to two or more additional wires, the two or more additional wires being directly coupled to a control box of a leak sensing system.

9. A leak sensor adapted to sense and indicate the presence of a fluid leak from a pipe, said leak sensor comprising:
   a film capable of visually indicating the presence of a fluid leak, wherein said film comprises a length sufficient to encircle a circumference of a pipe through which the fluid flows; and
   at least two wires disposed within the film at only a terminal end of the at least two wires and configured to be short-circuited when the film contacts fluid leaked from the pipe.

10. The leak sensor of claim 9, wherein the film comprises a litmus paper adapted to indicate one or more constituents of the leaked fluid.

11. The leak sensor of claim 9, further comprising an adhesive surface for attaching the leak sensor to the pipe.

12. The leak sensor of claim 9, wherein an end of each of the at least two wires is coupled to a first connector that enables the leak sensor to be readily connected to and disconnected from a second connector, wherein the second connector is coupled to at least two additional wires of a leak sensing system.

13. A leak sensing system comprising:
   a plurality of fluid sensors, each fluid sensor encircling a section of a pipe through which a fluid flows, wherein the fluid sensors are adapted to visually indicate a leak of the fluid from the pipe;
   a plurality of wires arranged in each of the plurality of fluid sensors, wherein the wires are adapted to detect and electrically indicate the presence of a fluid leak in proximity to a respective one of the fluid sensors; and
   a control terminal electrically connected to each of the plurality of wires, wherein the control terminal receives electrical signals from the wires providing leak information, said leak information capable of indicating whether the fluid has been leaked and which sensor or sensors have detected the leak.

14. The leak sensing system of claim 13, wherein the leak is one of a plurality of leaks, wherein the control terminal comprises a plurality of lamps configured to visually indicate to a user a location of each of the plurality of leaks, the pipe being one of a plurality of drain pipes used in a semiconductor cleaning apparatus, wherein the location of each of the leaks is uniquely identified and associated with a specific one of the drain pipes and a specific portion of the one drain pipe.

15. The leak sensing system of claim 14, wherein the control terminal further comprises a speaker configured to provide an audible alarm to indicate the presence of the fluid leak.

16. The leak sensing system of claim 13, wherein each of the fluid sensors comprises a litmus paper adapted to visually indicate one or more constituents of the leaked fluid.

17. The leak sensing system of claim 13, wherein the wires are disposed within the fluid sensor and are short-circuited when they contact the fluid.

18. The leak sensing system of claim 13, wherein the plurality of fluid sensors are arranged proximal to connection sections of the pipe where sections of the pipe are connected to each other.

19. A leak sensor adapted to sense and indicate the presence of a fluid leak from a pipe, said leak sensor comprising:
- a film capable of visually indicating the presence of a fluid leak, wherein said film comprises a length sufficient to encircle a circumference of a pipe through which the fluid flows; and
- at least two wires disposed within the film and configured to be short-circuited when the film contacts fluid leaked from the pipe,
- wherein a portion of each of the at least two wires is coated with a material comprising one of (a) fluorinated ethylene propylene, (b) perfluoroalkoxy copolymer, and (c) polytetrafluoro ethylene for protecting the portion of the at least two wires from the fluid.

20. A leak sensing system comprising:
- a plurality of fluid sensors, each fluid sensor encircling a section of a pipe through which a fluid flows, wherein the fluid sensors are adapted to visually indicate a leak of the fluid from the pipe;
- a plurality of wires arranged in each of the plurality of fluid sensors, wherein the wires are adapted to detect and electrically indicate the presence of a fluid leak in proximity to a respective one of the fluid sensors; and
- a control terminal electrically connected to each of the plurality of wires, wherein the control terminal receives electrical signals from the wires providing leak information, said leak information capable of indicating whether the fluid has been leaked and which sensor or sensors have detected the leak,
- wherein the wires are disposed within the fluid sensor and are short-circuited when they contact the fluid; and
- wherein a portion of each of the wires is arranged in a cable that is made of or coated with a material adapted to prevent the portion of each of the wires from contacting the fluid.

21. The leak sensing system of claim 20, wherein the material is one of (a) fluorinated ethylene propylene, (b) perfluoroalkoxy copolymer, and (c) polytetrafluoro ethylene.

22. A leak sensor adapted to sense and indicate the presence of a fluid leak from a pipe, said leak sensor comprising:
- a film capable of visually indicating the presence of a fluid leak, wherein said film comprises a length sufficient to encircle a circumference of a pipe through which the fluid flows; and
- at least two wires disposed within the film and configured to be short-circuited when the film contacts fluid leaked from the pipe,
- wherein a portion of each of the wires is arranged in a cable that is made of or coated with a material adapted to prevent the portion of each of the wires from contacting the fluid.

* * * * *